(12) United States Patent
Waclawsky et al.

(10) Patent No.: US 6,850,530 B1
(45) Date of Patent: Feb. 1, 2005

(54) METHODS AND APPARATUS FOR PROVIDING AND OBTAINING RESOURCE USAGE INFORMATION

(75) Inventors: John G. Waclawsky, Fredrick, MD (US); Kristen Marie Robins, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/498,099

(22) Filed: Feb. 4, 2000

(51) Int. Cl.[7] .......................... H04L 12/28; H04L 12/56
(52) U.S. Cl. ........................................ 370/401; 370/468
(58) Field of Search ................................ 370/229, 232, 370/234, 235, 400, 401, 468

(56) References Cited

U.S. PATENT DOCUMENTS

| | | | | |
|---|---|---|---|---|
| 5,481,540 A | * | 1/1996 | Huang | 370/401 |
| 5,633,861 A | | 5/1997 | Hanson et al. | 370/232 |
| 5,737,313 A | | 4/1998 | Kolarov et al. | 370/234 |
| 5,790,546 A | * | 8/1998 | Dobbins et al. | 370/400 |
| 5,850,388 A | * | 12/1998 | Anderson et al. | 370/252 |
| 5,898,671 A | * | 4/1999 | Hunt et al. | 370/235 |
| 5,926,463 A | * | 7/1999 | Ahearn et al. | 370/254 |
| 6,086,618 A | * | 7/2000 | Al-Hilali et al. | 703/2 |
| 6,333,917 B1 | * | 12/2001 | Lyon et al. | 370/236 |
| 6,337,861 B1 | * | 1/2002 | Rosen | 370/389 |
| 6,434,164 B1 | * | 8/2002 | Matsunaga et al. | 370/443 |
| 6,477,144 B1 | * | 11/2002 | Morris et al. | 370/230.1 |
| 6,535,523 B1 | * | 3/2003 | Karmi et al. | 370/468 |
| 6,539,022 B1 | * | 3/2003 | Virgile | 370/401 |
| 6,654,387 B1 | * | 11/2003 | Beser et al. | 370/485 |
| 2002/0099854 A1 | * | 7/2002 | Jorgensen | 709/249 |

OTHER PUBLICATIONS

*Request for Comments: 1393*, "Traceroute Using an IP Option," G. Malkin, Xylogics, Inc., Jan. 1993.
"Mapping the Internet with Traceroute," Jack Rickard, Internetica, Dec., 1996.

\* cited by examiner

*Primary Examiner*—Wellington Chin
*Assistant Examiner*—Chirag Shah
(74) *Attorney, Agent, or Firm*—Chapin & Huang, L.L.C.; David E. Huang, Esq.

(57) ABSTRACT

The invention is directed to techniques for providing and obtaining, from a network node (e.g., a router, bridge, hub, switch, etc.), resource usage information describing usage of resources within the network node. In one arrangement, a system includes a source computer which provides a data element, and a network node coupled to the source computer. The network node forms at least a portion of a network with the source computer. The network node is configured to receive the data element from the source computer, determine that the data element is stale based on a parameter within the data element, remove the data element from the network and send a signal to the source computer. The signal includes (i) an indication that the network node has removed the data element from the network, and (ii) resource usage information describing usage of resources within the network node.

43 Claims, 7 Drawing Sheets

| F 50 | C 52 | NUMBER 54 | LENGTH 56 | ID NUMBER 58 |
|---|---|---|---|---|
| OUTBOUND HOP COUNT 60 ||| RETURN HOP COUNT 62 ||
| ORIGINATOR IP ADDRESS 64 |||||

FIG. 3

| TYPE 70 | CODE 72 | CHECKSUM 74 |
|---|---|---|
| ID NUMBER 76 || UNUSED 78 |
| OUTBOUND HOP COUNT 80 || RETURN HOP COUNT 82 |
| OUTPUT LINK SPEED 84 |||
| OUTPUT LINK MTU 86 |||
| RESOURCE USAGE INFORMATION (E.G., HISTORY) 88 |||

METHODS AND APPARATUS FOR PROVIDING AND OBTAINING RESOURCE USAGE INFORMATION

BACKGROUND OF THE INVENTION

A typical network router includes a utility which allows a system administrator to trace a route from the router, i.e., a source computer, to a target computer. That is, this route tracing utility identifies nodes which form a network path from the source computer to the target computer. In a network which uses Transmission Control Protocol/Internet Protocol (TCP/IP), it is common for each router to include a route tracing utility called "traceroute".

In one implementation, the route tracing utility is a command line program which prompts the system administrator for a domain name that identifies the target computer. In response to the domain name, the route tracing utility returns an output including a list of routers (e.g., the domain names and/or IP addresses of the routers) which extend along a path between the source computer and the target computer. In some implementations, the output further includes roundtrip times for IP packets to travel from the source computer to the routers, and for associated response messages to travel from the routers back to the source computer.

It is common for the route tracing utility to use a Time-To-Live (TTL) network feature such as that of TCP/IP networks. This TTL feature was implemented to resolve a drawback of early TCP/IP networks. In such networks, a configuration anomaly within a router could cause packets to follow an endless loop within the network. That is, the packets would move from router to router in a circle and never leave the network. Over time, the number of packets travelling in this loop would accumulate to the point that the routers in the loop would suffer from performance degradation and become unable to route non-looping packets in a timely manner.

To overcome this drawback, a TTL field was added to IP packets. The contents of the TTL field of a packet indicate the number of network nodes that can process that packet before that packet is deemed stale and removed from the network. The following is a more detailed explanation of how the TTL field is used.

When a source computer attempts to send a packet to a target computer along a path of routers, the source computer initializes the contents of the TTL field of the packet to an initial value (e.g., between 0 and 255) prior to sending the packet along the path toward the target computer. The first router to receive the packet decrements the contents of the TTL field of the packet, and determines whether the packet is stale by comparing the decremented contents to a predetermined value (e.g., 0 or 1). If the packet is stale, the first router removes the packet from the network and sends an Internet Control Message Protocol (ICMP) error message back to the source computer to indicate that the first router has removed the packet from the network. However, if the packet is not stale, the first router forwards the packet to the next router along the path leading to the target computer. The next router then processes the packet in a similar manner, and so on, until the packet arrives at the target computer, or until a router along the path removes the packet because the packet has become stale. Accordingly, any packet which is endlessly caught in a loop inevitably will become stale (as routers decrement its TTL field contents) and be removed from the network by a router.

At the source computer, when a system administrator invokes a route tracing utility which relies on the above-described TTL feature, the system administrator typically provides the route tracing utility with a domain name identifying a target computer. In response, the route tracing utility generates a packet and sets the TTL field of that packet initially to 1. Then, the route tracing utility sends that packet from the source computer, to the target computer. Assuming that the first router to receive the packet is a node (e.g., a data communications device) other than the target computer, the first router receiving the packet decrements the contents of the TTL field and determines that the packet is stale (e.g., the TTL contents now equal 0). Accordingly, the first router removes the packet from the network and sends an ICMP message back to the source computer. The source computer is able to identify the first router as the first node along the path leading to the target computer (e.g., from address information in the header of the ICMP error message), and the round trip time (e.g., by calculating the difference between the time the source computer sends the packet and the time the source computer receives the ICMP error message).

The source computer then generates another packet and sets the TTL field of that packet to 2. The source computer then sends that packet toward the target computer along the path. When the first router receives that packet, the first router decrements the contents of the TTL field and determines that the packet is not stale (e.g., the TTL contents are greater than 0). Accordingly, the first router identifies the second router on the path leading to the target computer, and sends the packet to the second router. When the second router receives and processes the packet, the second router determines that the packet is now stale, removes the packet from the network, and sends an ICMP error message back to the source computer. The source computer processes this ICMP error message to identify the second router and an determine the round trip time for the packet.

The source computer continues to (i) generate packets with TTL fields having higher and higher values, and (ii) send those packets toward the target computer until the target computer finally receives a packet and does not respond with an ICMP error message (e.g., the target computer can respond with an acknowledgement message). The ICMP error messages that the source computer receives prior to reaching the target computer enable the source computer to identify the path leading from the source computer to the target computer (assuming that the path did not change during the route tracing process).

SUMMARY OF THE INVENTION

In general, the route tracing utility of a TCP/IP network router relies on the TTL feature of the network. That is, from a router operating as a source computer, the route tracing utility sends IP packets having varying TTL values to a target computer. Routers residing along a path between the source computer and the target computer remove the IP packets as they become stale and return ICMP error messages back to the source computer. Based on these ICMP error messages, the route tracing utility generates the route tracing utility information including (i) identification of the routers along the path leading from the source computer to the target computer, and (ii) round trip times for the IP packets to travel from the source computer to the routers and responding ICMP error messages to travel from the routers back to the source computer.

Unfortunately, a system administrator using the route tracing utility at the source computer can obtain only a limited amount of network information (e.g., identification of which router of the network removed stale packets and associated round trip times). The system administrator cannot obtain extensive network information such as information regarding resource usage of the routers along the path leading from the source computer to the target computer.

In contrast to routers which use a conventional route tracing utility which provides limited network information, the invention is directed to techniques for providing and obtaining, from a network node (e.g., a router, bridge, hub, switch, etc.), resource usage information describing usage of resources within the network node. One arrangement of the invention is directed to a system for obtaining resource usage information. The system includes a source computer which provides a data element (e.g., a packet, frame, cell, message, etc.), and a network node coupled to the source computer. The network node forms at least a portion of a network with the source computer. The network node is configured to receive the data element from the source computer, determine that the data element is stale based on a parameter within the data element, remove the data element from the network and send a signal to the source computer. The signal (e.g., a modified ICMP error message) includes (i) an indication that the network node has removed the data element from the network, and (ii) resource usage information describing usage of resources within the network node.

There are a number of uses for such resource usage information. For example, resource usage information can be accumulated for multiple nodes along a particular path leading from the source computer to a target computer, and later analyzed to obtain a better understanding of the behavior of the network. Additionally, such information could assist network serviceability. Furthermore, such information could be used to globally tune network usage (e.g., identify performance bottlenecks, resolve network design problems, etc.). Also, such information could be used to determine system wide feature, function and services usage for one or more traffic flows.

In one arrangement, the network node includes multiple resources, and a control module which is coupled to the multiple resources. Such resources may include hardware resources such as memory locations, buffer space, integer execution units, floating point execution units, etc. Additionally, or in the alternative, the resources may include software resources such as encryption/decryption routines and encoding/decoding routines. In this arrangement, the control module preferably is capable of processing non-stale data elements using different combinations of the multiple resources. In particular, the control module is configured to process the data element provided by the source computer as a non-stale data element using a combination of the multiple resources, and to generate, as the resource usage information, a history which identifies the combination of the multiple resources that processed the data element as a non-stale data element. The history can then be analyzed and used for tuning purposes (e.g., to optimize data element throughput of the network node).

In one arrangement, the parameter within the data element is a Time-To-Live field. The contents of the Time-To-Live field identify a limit to the number of remaining nodes which can process the data element within the network. In this arrangement, the network node includes circuitry that (i) updates a value defined by the contents of the Time-To-Live field of the data element to determine that the limit to the number of remaining nodes which can process the data element within the network has been reached, and (ii) provides, as the signal to the source computer of the network, an Internet Control Message Protocol error message. This arrangement enables implementation of the invention as a route tracing utility enhancement. Since routers typically include such a route tracing utility, it may be less burdensome to incorporate the invention as an enhancement to an existing tool relative to implementing the invention as a new tool.

In one arrangement, the source computer includes memory which stores a database, and a controller coupled to the memory. The controller is configured to extract the resource usage information from the signal, update contents of the database with the extracted resource usage information, generate a tuning command based on the updated contents of the database, and send the tuning command to the network node. The network node is capable of processing data elements based on a tuning attribute. In particular, the network node includes circuitry that (i) receives, from the source computer, the tuning command, and (ii) adjusts the tuning attribute based on the tuning command in order to change a manner in which the network node processes data elements. Accordingly, the invention can be used to improve performance within network nodes thus optimizing overall network performance.

Another arrangement of the invention is directed to a computer program product which includes a computer readable medium having instructions stored thereon for obtaining resource usage information from a node of a network. The instructions, when carried out by the computer, cause the computer to perform a particular method. The method includes the steps of generating, for a data element, a value for a parameter within the data element that will cause the node of the network to determine that the data element is stale when the node of the network receives the data element. The method further includes the steps of sending the data element to the node of the network, and receiving a signal from the node of the network. The signal includes (i) an indication that the node of the network has removed the data element from the network, and (ii) resource usage information describing usage of resources within the node of the network.

Yet another arrangement of the invention is directed to a computer program product that includes a computer readable medium having instructions stored thereon for providing resource usage information. The instructions, when carried out by the computer, cause the computer to perform a certain method. The method includes the steps of receiving a data element from a source computer of the network; determining that the data element is stale based on a parameter within the data element; and removing the data element from the network and sending a signal to the source computer of the network. The signal includes (i) an indication that the node of the network has removed the data element from the network, and (ii) resource usage information describing usage of resources within the node of the network.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for providing and obtaining, from a network node (a data communications device such as a router, bridge, hub, switch, etc.), resource usage information describing usage of resources within the network node. Such information can be used to identify bottlenecks, optimize resource allocation, and resolve performance problems within the network node. As a result, the invention can assist capacity planning and improve computer system serviceability, reliability and performance.

Figure 1:
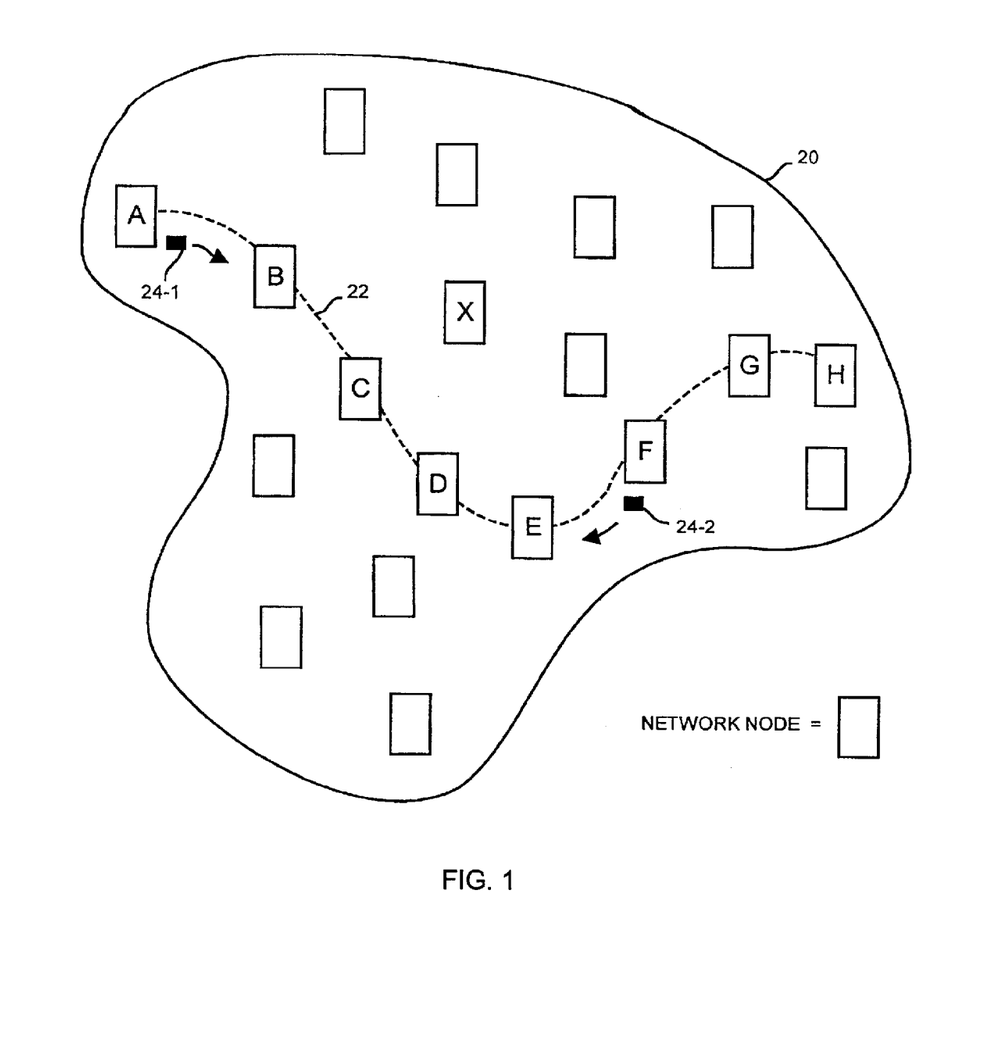
FIG. 1 shows a block diagram of a network having multiple nodes, one of which operates as a source computer to provide a data element, and another which removes the data element from the network and provides, to the source computer, a signal (e.g., a modified ICMP error message) including (i) an indication that it has removed the data element from the network and (ii) resource usage information describing its usage of resources.

FIG. 1 shows a network 20 which is suitable for use by the invention. The network 20 includes multiple network nodes (e.g., NODE X) and an interconnection medium 22 (e.g., fiber optic cable, electrical wire, wireless communications mechanisms, etc.). A pair of nodes can communicate with each other by exchanging data elements 24 (e.g., packets, frames, cells, messages, etc.) through paths formed by other nodes and the interconnection medium 22. For example, NODE A can operate as a source computer by sending a data element 24-1 to NODE H, which operates as a target computer. In this example, the data element 24-1 travels from NODE A to NODE H along a path formed by the interconnection medium 22 and a set of intermediate nodes, i.e., NODE B, NODE C, NODE D, NODE E, NODE F, and NODE G.

The nodes such as NODE B, NODE C, NODE D, NODE E, NODE F and NODE G, which operate as intermediate nodes, are configured to provide resource usage information in response to special data elements 24. In particular, each intermediate node is configured to receive a data element 24 from a source computer (e.g., NODE A), and determine whether that data element 24 is stale and of a special type based on one or more parameters within the data element 24. If that intermediate node determines that the data element 24 is both stale and of the special type, that intermediate node removes the data element 24 from the network and sends, to the source computer, a signal (e.g., an error message) including (i) an indication that the intermediate node has removed the data element 24 from the network, and (ii) resource usage information describing usage of resources within the intermediate node.

Removal of the data element 24 from the network 20 prevents the chance that the data element 24 will inadvertently loop around the same nodes over and over again due to a configuration anomaly in one or more nodes. Furthermore, acquisition of the resource usage information provides an understanding of network behavior at the intermediate node. Such information can be used to identify performance problems, optimize resource allocation, and alleviate bottlenecks residing at the intermediate node.

In one arrangement, the network 20 is a Transmission Control Protocol/Internet Protocol (TCP/IP) network. In this arrangement, the intermediate nodes (e.g., NODE B, NODE C, NODE D, NODE E, NODE F and NODE G, among others) preferably are configured to decrement the contents of their Time-To-Live (TTL) fields, and determine whether any of the data elements 24 (e.g., IP packets) are stale based on the decremented TTL field contents. If an intermediate node (e.g., NODE F) determines that a data element 24 is (i) stale and (ii) a special data element (e.g., based on the contents of a type field), the intermediate node removes that data element 24 from the network 20 and sends a specialized Internet Control Message Protocol (ICMP) error message (e.g., data element 24-2) to the originating source computer (e.g., NODE A). This data element 24-2 is different from conventional ICMP error messages because it includes both (i) an indication that the intermediate node has removed the data element 24-1 from the network 20, and (ii) resource usage information describing usage of resources within the intermediate node. Further details of the invention will now be provided with reference to FIG. 2.

Figure 2:
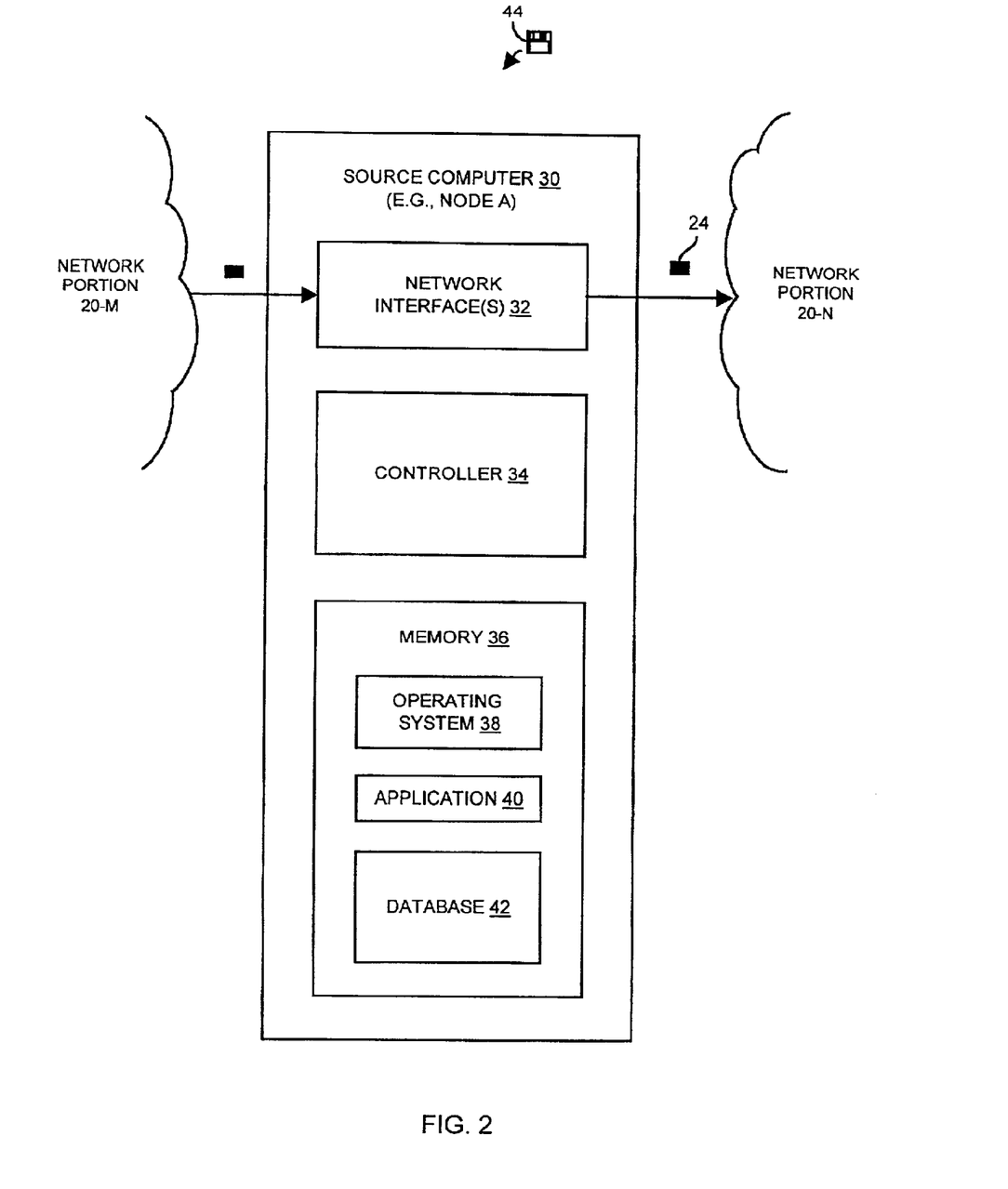
FIG. 2 shows a block diagram of an apparatus that is suitable for use as the source computer of FIG. 1.

FIG. 2 shows details of a source computer 30 which is suitable for use as NODE A. The source computer 30 includes a network interface 32, a controller 34 and memory 36. The network interface 32 is capable of transmitting and receiving data elements 24 with the network 20. The network interface 32 can exchange data elements 24 with the same portion of the network 20, or with different network portions (e.g., portions 20-M and 20-N).

The memory 36 includes multiple memory constructs including, among other things, an operating system 38, an application 40 and a database 42. The controller 34 operates in accordance with the operating system 38 and the application 40 to obtain resource usage information from one or more network nodes, and to store the resource usage information in the database 42.

In one arrangement, a computer program product 44 (e.g., one or more CDROMs, tapes, diskettes, etc.) provides one or more of the above-described memory constructs (e.g., the application 40) to the source computer 30. For example, the computer program product 44 may include both the operating system 38 and the application 40. In this example, the operating system 38 and the application 40 can be installed on the source computer 30, and then invoked to create other memory constructs such as the database 42. The Cisco IOS manufactured by Cisco Systems of San Jose, Calif. is suitable for use as the operating system 36. As an alternative example, the source computer 30 can acquire the application 40 through other means, e.g., via a network download through the network interface 32.

When the source computer 30 operates in accordance with the application 40, the source computer 30 sends a specialized data element 24 to a target computer (e.g., see NODE H in FIG. 1). An IP packet having a TTL field is suitable for use as the specialized data element 24. Prior to transmitting the specialized data element 24, the source computer 30 sets the contents of the TTL field to an initial value that will cause an intermediate node along the path leading to the target computer to determine that the specialized data element 24 is stale. Preferably, the source computer 30 further sets another field (e.g., a type field) of the specialized data element 24 (thus identifying the data element 24 as a special type of data element 24) to request that the intermediate node provide a special ICMP error message, namely one that includes both (i) an indication that the intermediate node has removed the specialized data element 24 from the network 20, and (ii) resource usage information describing usage of resources within the intermediate node.

Figure 3:
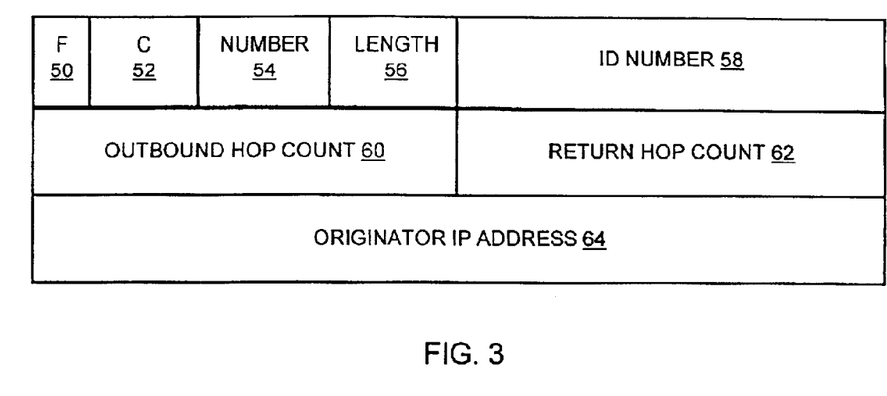
FIG. 3 shows a block diagram of a portion of a traceroute packet which is suitable for use as the data element of FIG. 1.
Figure 4:
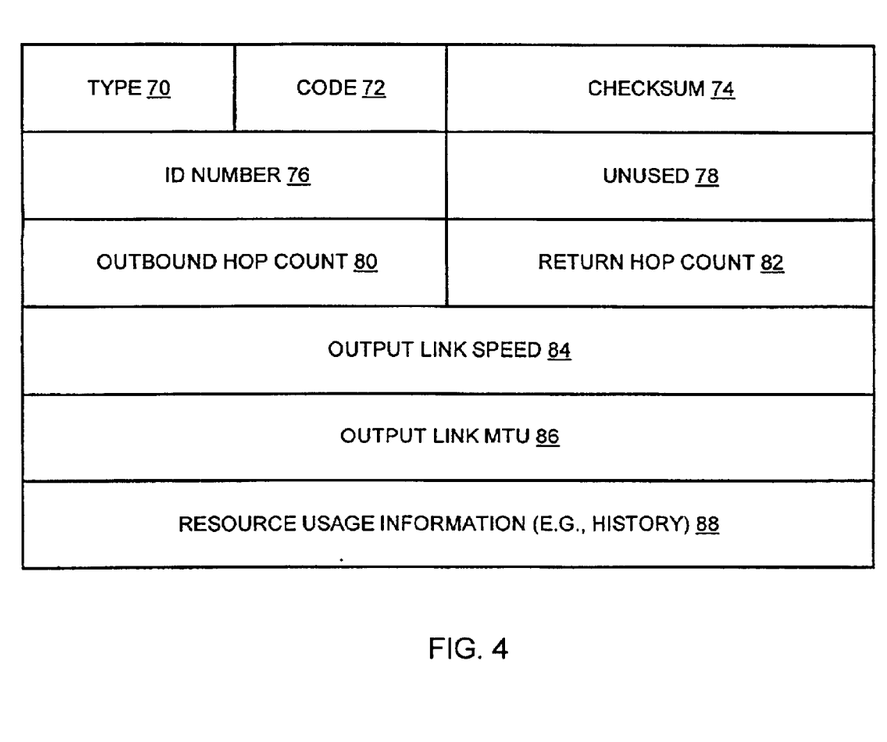
FIG. 4 shows a block diagram of a portion of an Internet Control Message Protocol (ICMP) error message which is suitable for use as the message of FIG. 1.

By way of example only, FIGS. 3 and 4 show portions of an IP packet and an ICMP error message that are suitable for use by the invention. In particular, as shown in FIG. 3, the IP packet may include, among other fields, a copy-to-fragment field 50, a class field 52, a number field 54, a length field 56, an ID number field 58, an outbound hop count field 60, a return hop field 62 and an originator IP address field 64. The ID number field 58 is suitable for use as the type field through which the source computer 30 can notify the intermediate node that the IP packet is a special data element 24 (i.e., by placing a particular value in the type field). Accordingly, if the intermediate node determines that such an IP packet is stale and of this special type, the intermediate node can respond with a special ICMP error message that includes both (i) an indication that the intermediate node has removed the specialized data element 24 from the network 20, and (ii) resource usage information describing usage of resources within the intermediate node. In contrast, placement of a different value (e.g., a conventional or standard value) in the type field could result in the intermediate node providing a conventional ICMP error message (e.g., an ICMP error message without the resource usage information).

As shown in FIG. 4, the ICMP error message may include, among other things, a type field 70, a code field 72, a checksum field 74, an ID number field 76, an unused field 78, an outbound hop count field 80, a return hop count field 82, an output link speed field 84, an output link MTU field 86, and a resource usage information field 88. The resource usage information from the intermediate node can be carried in the resource usage information field 88.

A detailed description of particular portions of the IP packet of FIG. 3 and the ICMP error message of FIG. 4 is provided by a publication entitled "Traceroute Using an IP Option," Request for Comments: 1393, by G. Malkin, Xylogics, Inc., January 1993, the entire teachings of which are hereby incorporated by reference in their entirety.

Figure 5:
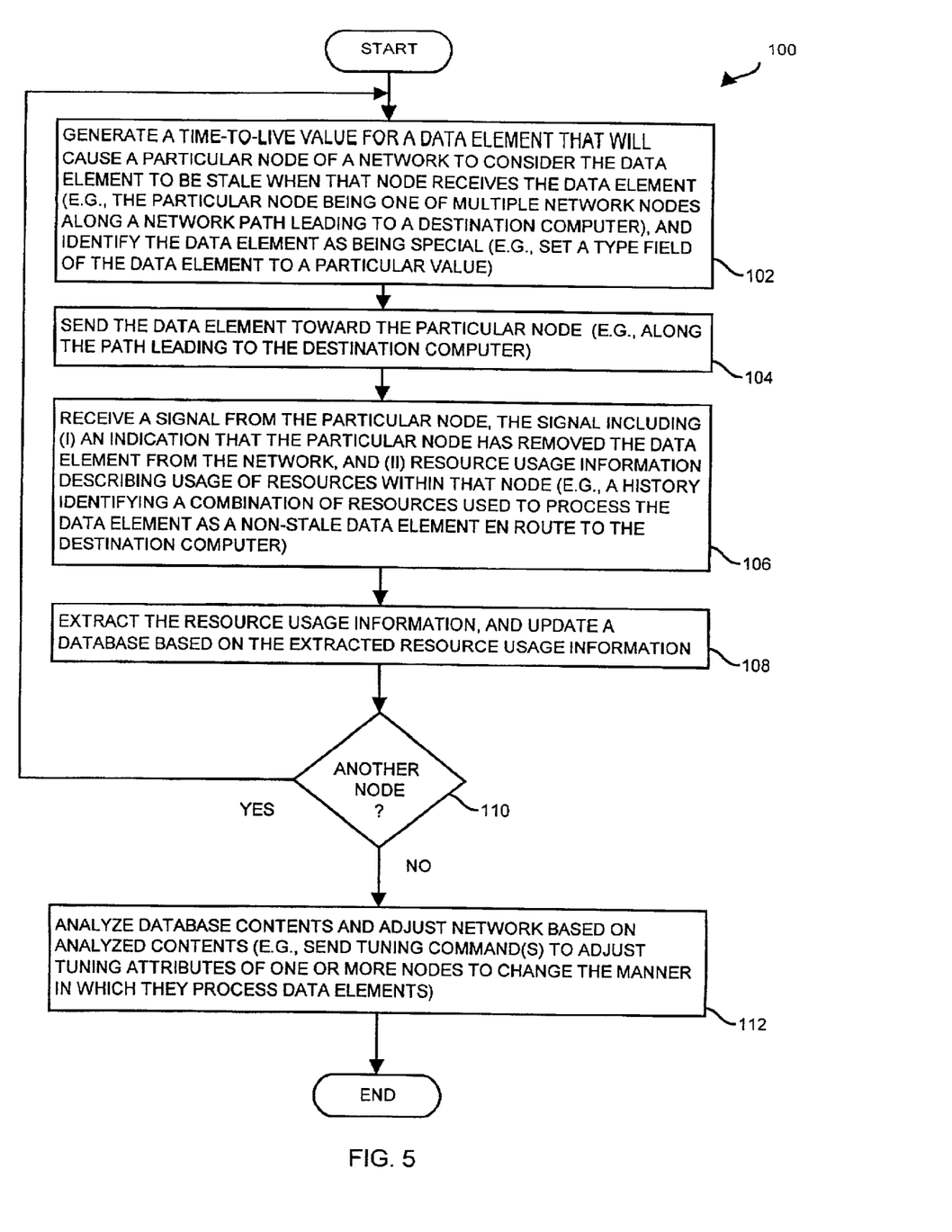
FIG. 5 shows a flow diagram of a procedure which is suitable for use by the source computer of FIG. 1.

FIG. 5 illustrates a procedure 100 which is performed by the source computer 30 when operating in accordance with instructions of the application 40 in order to obtain resource usage information from a network node. In step 102, the controller 34 of the source computer 30 generates a Time-To-Live value for a data element 24 that will cause that node to consider that data element 24 stale when that node receives that data element 24. Additionally, the controller 34 identifies the data element 24 as being special (e.g., by setting a type field to a particular value). In one arrangement, the data element 24 is an IP packet, and the TTL value is stored as the contents of the TTL field of that IP packet.

In step 104, the controller 34 sends the special data element 24 (e.g., data element 24-1 in FIG. 1) along a path toward the particular node. The particular node determines that the data element 24 is stale and removes that data element 24 from the network 20. Additionally, the particular node responds to the data element 24 by sending, back to the source computer 30, a signal which includes both (i) an indication that the particular node has removed the data element 24 from the network 20, and (ii) resource usage information describing usage of resources within the particular node.

It should be understood that, in step 104, the controller 34 does not need to address the data element 24 to the particular node. Rather, the controller 34 can address the data element 24 to a different destination node along a path on which the particular node resides. Accordingly, the particular node will receive and remove the data element 24 from the network 20 before the data element 24 reaches the destination node.

In step 106, the controller 34 receives the signal from the particular node. In the arrangement in which the data element 24 is an IP packet having a TTL field, the controller 34 preferably receives an ICMP error message as the signal from the particular node.

In step 108, the controller 34 extracts the resource usage information, and updates the database 42 of the source computer 30 based on the extracted resource usage information. In one arrangement, the resource usage information is a history identifying a combination of resources of the particular node which the particular node used to process the data element 24 as a non-stale data element 24 en route to a destination node.

In step 110, the controller 34 determines whether there is another node from which to obtain resource usage information. In particular, in one arrangement, the application 40 directs the controller 34 to repeat steps 102 through 108 for at least one other node. If there are no other nodes from which to obtain resource usage information, the controller 34 proceeds to step 112.

In step 112, the controller 34 analyzes the contents of the database 42, and adjusts the network 20 based on the analyzed contents. For example, the controller 34 can analyze the contents of the database 42 to identify bottlenecks, resolve performance problems, or find opportunities to optimize resource allocation by analyzing the database contents. The controller 34 can then send one or more tuning commands to the particular node to adjust the manner in which the particular node processes data elements 24, e.g., to assist capacity planning and/or improve computer system serviceability, reliability and performance.

Further details of the operation of the source computer 30 will be provided by way of the following example. Suppose that NODE A (see FIG. 1) is a source computer 30 seeking to obtain resource usage information from NODE F. By way of example only, the controller 34 of NODE A generates a Time-To-Live value for a data element 24-1 that will cause NODE F to consider that data element 24-1 stale when NODE F receives that data element 24-1 (step 102). In the example, NODE A can set the contents of a type field within the data element 24-1 to indicate to NODE F that NODE F should respond with both (i) an indication that NODE F has removed the data element 24-1 and (ii) resource usage information describing usage of resources within NODE F if NODE F determines that the data element 24-1 is stale and removes the data element 24-1 from the network 20.

After NODE A generates an appropriate TTL value for the data element 24-1, NODE A sends the data element 24-1 toward NODE F (step 104). It is not necessary that the NODE A address the data element 24-1 to NODE F. Rather, since NODE F resides on a path leading to NODE H, NODE A can address the data element 24-1 to NODE H (see FIG. 1) and send the data element 24-1 toward NODE F and NODE H along that path.

When the data element 24-1 reaches NODE F, NODE F receives the data element 24-1, decrements the TTL value of the data element 24-1, and determines that the data element 24-1 is now stale. NODE F then removes the data element 24-1 from the network 20, and generates a data element 24-2 for the originator of the data element 24-1, i.e., NODE A. The data element 24-2 includes (i) an indication that NODE F has removed the data element 24-1 from the network 20, and (ii) resource usage information describing usage of resources within NODE F. In one arrangement, the data element 24-2 includes a history identifying a combination of resources used by NODE F to process the data element 24-1 as a non-stale data element 24 en route to NODE H. NODE F then sends the data element 24-2 to NODE A.

NODE A receives the data element 24-2 (step 106), extracts the resource usage information from the data element 242, and stores the extracted resource usage information in the database 42 of NODE A (step 108).

NODE A can loop back (step 110) to repeat steps 102 through 108 in order to obtain resource usage information from other nodes. For example, NODE A can repeat steps 102 through 108 to obtain resource usage information from NODE G, which is further down the path leading to NODE H. If there are no other nodes from which to obtain resource usage information, the controller 34 of NODE A can analyze the contents of the database 42, and adjust the network 20 based on the contents (step 112). For example, in an automated fashion, NODE A can send tuning commands to NODE F to modify the manner in which NODE F processes data elements 24. As another example, a systems administrator can study the database contents and manually send tuning commands to NODE F to modify the manner in which NODE F processes data elements 24.

It should be understood that TCP/IP networks typically (i) include a traceroute utility, and (ii) are configured to decrement the contents of the TTL field in IP packets and remove any stale IP packets based on these decremented contents. Accordingly, the invention can be implemented as an extension of the conventional traceroute utility. In such an implementation, a systems administrator working at a source computer 30 can simply invoke the traceroute utility with a special parameter to obtain resource usage information from nodes along a path leading to a particular target computer. In response, the source computer 30 will send out multiple IP packets having varying TTL field contents. The nodes will remove the IP packets as they become stale, and return ICMP error messages containing both indications of such IP packet removals as well as resource usage information from the nodes. The source computer 30 can then store the resource usage information in a database, analyze the resource usage information, and tune the network based on the resource usage information.

Figure 6:
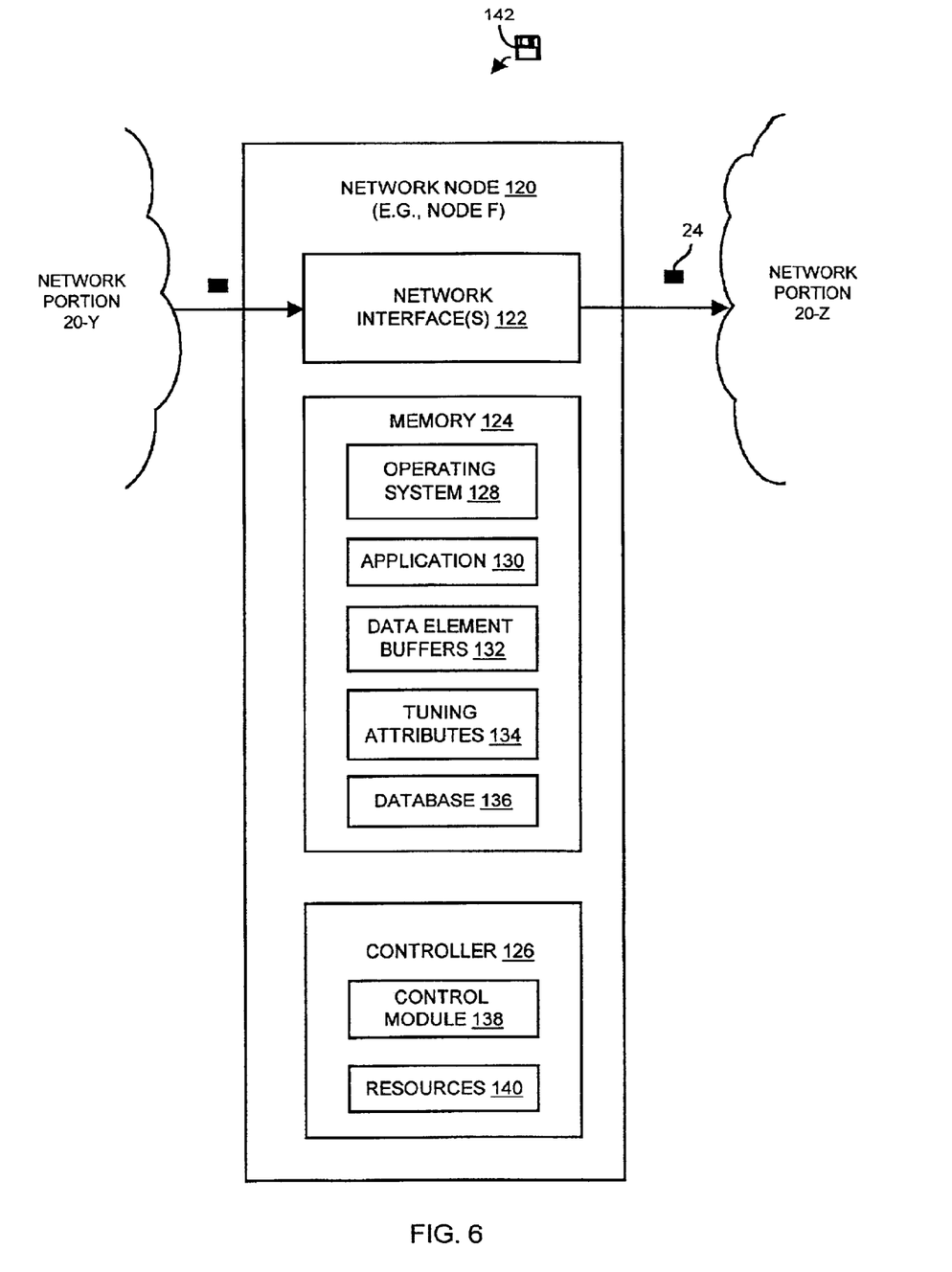
FIG. 6 shows a block diagram of a node which is suitable for use as the message-providing node of FIG. 1.

FIG. 6 shows a network node 120 that is suitable for use as one of the nodes of the network 20 in FIG. 1 (e.g., NODE F). The node 120 includes a network interface 122, memory 124 and a controller 126. The network interface 122 is capable of sending data elements 24 to the network 20, and receiving data elements 24 from the network 20. The network interface 122 can exchange data elements 24 with the same portion of the network 20, or with different network portions (e.g., portions 20-Y and 20-Z).

The memory 124 stores multiple memory constructs including, among others, an operating system 128, an application 130, data element buffers 132, tuning attributes 134, and a database 136. The controller 126 includes a control module 138 and resources 140. In one arrangement, the controller 126 is a data processor, and the control module 138 and the resources 140 logically exist as the data processor runs instructions of the application 130. In other arrangements, one or more of the control module 138 and resources 140 is implemented in hardware, e.g., as an Application Specific Integrated Circuit (ASIC), analog circuit, etc. In these other arrangements, the various components of the controller 126 can still reference information within the application 130 for direction during operation.

In one arrangement, a computer program product 142 (e.g., one or more CDROMs, diskettes, tapes, etc.) provides one or more of the above-listed memory constructs (e.g., the application 130) to the node 120. For example, in one arrangement, the computer program product 142 includes the operating system 128 and the application 130. In this arrangement, the operating system 128 and the application 130 can be installed on the node 120, and subsequently invoked to create other memory constructs such as the data element buffers 132, the tuning attributes 134 and the database 136. The Cisco IOS manufactured by Cisco Systems of San Jose, Calif. is suitable for use as the operating system 128. As an alternative example, the node 120 can acquire the application 130 through other means, e.g., by a network download through the network interface 122.

When the node 120 operates in accordance with the particular constructs stored in the memory 124 (e.g., the operating system 128, the application 130 and the tuning attributes 134), the node 120 operates as a data communications device by receiving data elements 24 from the network 20 and transmitting data elements 24 to the network 20. In particular, when the node 120 receives a data element 24, the node 120 decrements contents of the TTL field of that data element 24. If the node 120 determines that the data element 24 is not stale, the node 120 identifies a port of the network interface 122 through which to transmit the data element 24, and transmits the non-stale data element 24 through that port. However, if the node 120 determines that the data element 24 is stale, the node 120 removes the stale data element 24 from the network 20, and sends an ICMP error message back to the source computer 30. If the data element 24 is a special data element 24 (e.g., based on the contents of a type field), the ICMP error message includes both (i) an indication that the intermediate node has removed the special data element 24 from the network 20, and (ii) resource usage information describing usage of resources within the node 120.

Figure 7:
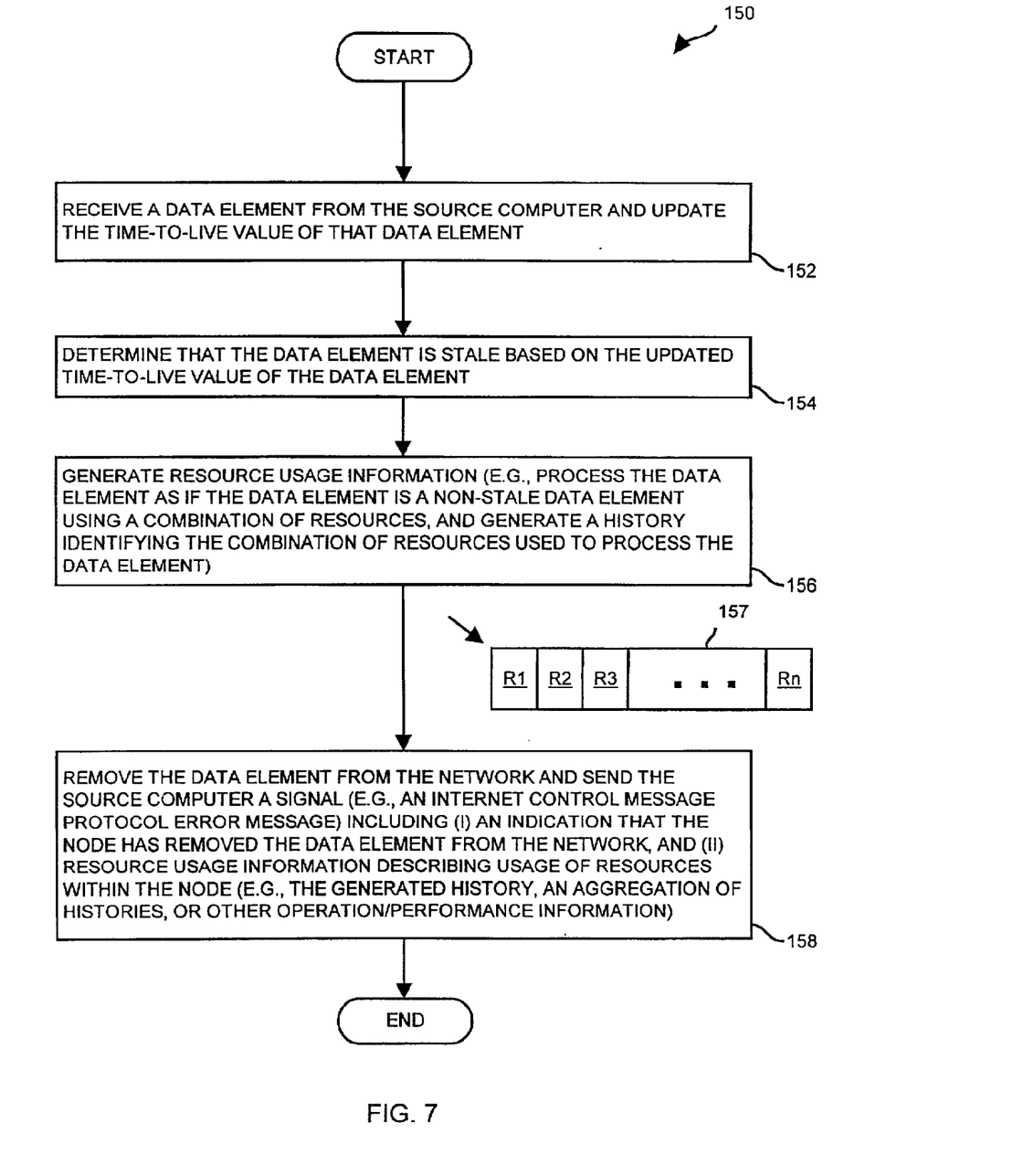
FIG. 7 shows a flow diagram of a procedure which is suitable for use by the message-providing node of FIG. 6.

FIG. 7 illustrates a procedure 150 which is performed by the controller 138 of the network node 120 when operating in accordance with instructions of the application 130 to provide a signal containing resource usage information in response to receipt of a special data element 24 from a source computer. In step 152, the controller 138 receives the special data element 24 from the source computer through network interface 122, and updates a Time-To-Live value of that data element 24 (e.g., decrements the contents of a TTL field).

In step 154, the controller 138 determines that the data element 24 is a stale data element 24 (e.g., by comparing the updated contents of the TTL field to 0 or 1). In one arrangement, the node 120 can provide the resource usage information in response to special stale data elements 24 and not provide such information in response to other types of stale data elements 24. In this arrangement, the node distinguishes special stale data elements 24 from other stale data elements 24 based on another data element attribute (e.g., contents of a type field of the data element 24).

In step 156, the controller 138 generates the resource usage information describing the usage of resources within the node 120. In one arrangement, the controller 138 processes the special stale data element 24 as if it were a standard non-stale data element 24 using a combination of the resources 140 (also see FIG. 6), and generates a history 157 which identifies the combination of resources 140 used to process the special stale data element 24 as a standard non-stale data element, e.g., by setting/clearing bits (e.g., R1,. . . , Rn) associated with the resources 140. In other arrangements, the resource usage information includes other information such as an aggregation of such histories 157 (e.g., counts associated with each resource 140), other operating data (e.g., tuning attributes 134), performance information (traffic conditions, throughput values), etc.

In step 158, the controller 138 removes the special stale data element 24 from the network 20, and sends the signal containing the resource usage information to the source computer. In one arrangement where the data element is an IP packet, the signal is preferably a special ICMP error message which includes both (i) an indication that the node 120 has removed the special data element 24 from the network 20, and (ii) the resource usage information.

Figure 8:
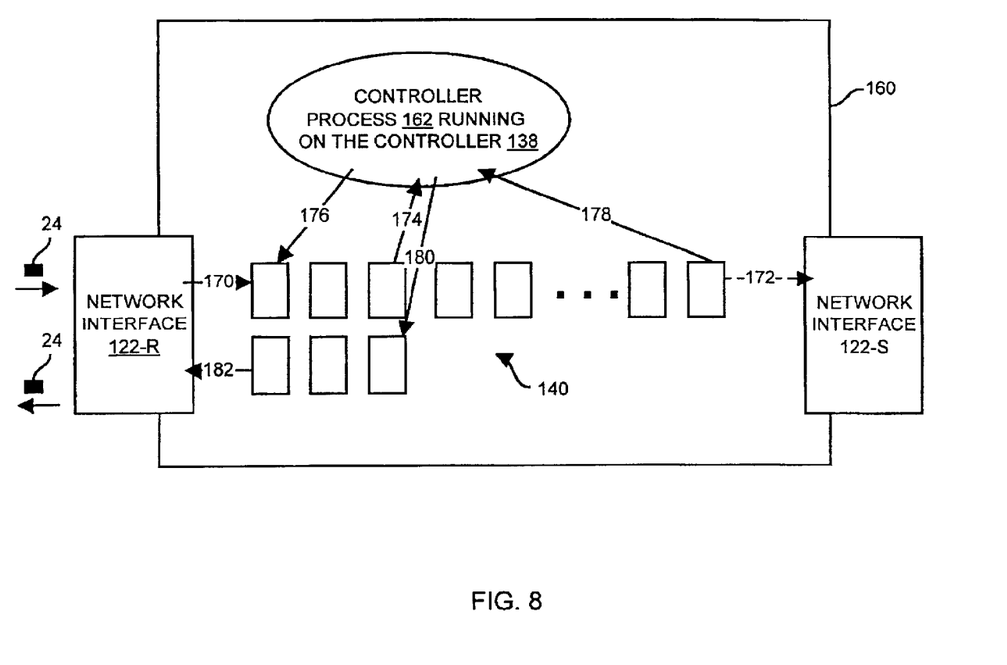
FIG. 8 shows a block diagram which logically illustrates an operating arrangement for the message-providing node of FIG. 6.

In one arrangement 160, which is illustrated in FIG. 8, the node 120 operates in a "conveyor belt" manner when processing data elements 24. In this arrangement 160, the controller 138 (e.g., a process 162 running on the controller 138) processes each data element 24 received by the network interface 122, by passing that data element 24 through a series of resources 140. In particular, the controller 138 moves a data element 24 from a portion of the network interface 122-R (e.g., a first port) to the series of resources 140 (illustrated by the arrow 170 in FIG. 8). The series of resources 140 then processes the data element 24. That is, a first resource 140 performs a first operation (e.g., decryption) on the data element 24 before the controller 138 passes that data element 24 onto a second resource 140. The second resource 140 then performs a second operation (e.g., decompression) on the data element 24 before the controller 138 passes the data element 24 onto a third resource 140, and so on.

If the controller 138 determines that the data element 24 is not stale, the controller 138 continues to pass the data element 24 through each resource 140 until the non-stale data element 24 has been fully processed. After the non-stale data element 24 has been fully processed by the series of resources 140, the controller moves the data element 24 to another portion of the network interface 122-S (e.g., a second port) to transmit the data element 24 back into the network 20 (illustrated by the dashed arrow 172 in FIG. 8).

If the controller 138 determines that the data element 24 is stale and not special, the controller 138 can process the data element 24 in a conventional manner, i.e., remove the data element 24 from the network 20, and provide a conventional ICMP error message back to the source computer (arrows 180 and 182).

However, if the controller 138 determines that the data element 24 is stale and special, the controller 138 removes the stale data element 24 from the series of resources 140 (arrow 174), and places the special stale data element 24 at the beginning of the series of resources 140 (arrow 176) in order to process the stale data element 24 as a non-stale data element 24, i.e., to fully process the stale data element 24 through the entire series of resources 140. Accordingly, the first resource 140 performs the first operation (e.g., decryption) on the stale data element 24 before the controller 138 passes the stale data element 24 onto the second resource 140. Next, the second resource 140 performs the second operation (e.g., decompression) on the stale data element 24 before the controller 138 passes the stale data element 24 onto the third resource 140, and so on. In this way, the data element 24 is assuredly processed in the same manner as if it were to fully transit the arrangement 160 (i.e., the network node 120 of FIG. 6). Usage information is monitored and recorded as the data element 24 is processed.

Eventually, the stale data element 24 reaches the end of the series of resources 140. When this situation occurs, the controller 138 removes the stale data element 24 from the series of resources 140 (arrow 178), rather than pass the stale data element 24 to the portion of the network interface 122-S for transmission out into the network 20. Here, the controller 138 removes the stale data element 24 from the network 20, and generates a signal (an error message) which includes both (i) an indication that the data element 24 has been removed from the network 20, and (ii) resource usage information describing usage of resources by the arrangement 150 (arrows 180, 182). In one arrangement, the resource usage information includes a history which identifies each of the resources in the series of resources that processed the stale data element 24 as if it were a non-stale data element. That is, the history identifies the resources 140 between arrows 170 and 172/178 of FIG. 8. Next, the controller 138 provides the signal to the network interface 122 (e.g., the first port 122-R that originally received data element 24, or a different port) to transmit the signal to the source computer which originated the data element 24 (arrow 182).

When the source computer (e.g., NODE A of FIG. 2) receives the signal containing the resource usage information, the source computer can store the information in a database (e.g., database 42), and later tune the network 20 based on the contents of that database. For example, as described earlier in connection with step 112 of FIG. 5, the source computer can analyze the resource usage information and adjust tuning parameters within one or more data communications devices within the network 20 (e.g., in the node 120 which provided the resource usage information). Accordingly, the invention provides the capability to modify network behavior (e.g., identify bottlenecks, optimize resource allocation, and resolve performance problems). Furthermore, the invention can assist with capacity planning, improve computer system serviceability, reliability and performance, and provide other optimization benefits.

A data communications device which processes non-stale packets using series of resources is described in U.S. application Ser. No. 09/419,035 (Moberg et. al.), the teachings of which are hereby incorporated by reference in their entirety. In U.S. application Ser. No. 09/419,035, the resources of the data communications device are arranged as chains of elements, and a "chain walker" processes a packet by passing the packet to each element (resource) of a particular chain. It should be understood that the chain walker approach of U.S. application Ser. No. 09/419,035 is suitable for use by the arrangement 150 of FIG. 7 and is provided by way of example only, and that other approaches are suitable for use by the invention as well.

Additionally, techniques for measuring resource usage within a computer, such as the data communications device of U.S. application Ser. No. 09/419,035, is provided in U.S. application Ser. No. 09/460,323 (Robins et. al.), the teachings of which are hereby incorporated by reference in their entirety. In U.S. application Ser. No. 09/460,323, a computer (e.g., a data communications device) assigns usage fields to data elements (e.g., packets) when they arrive, and adjusts the contents of the usage fields to identify particular computer resources which are used to process the data elements. Accordingly, the computer can measure or track resource usage on a data element by data element basis. It should be understood that the measuring techniques of U.S. application. Ser. No. 09/460,323 are suitable for measuring resource usage in the arrangement 150 of FIG. 7 and is provided by way of example only, and that other arrangements are suitable for use by the invention as well.

The features of the invention may be particularly useful in computerized devices manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, there are configurations for the nodes (e.g., the source computer and intermediate nodes) other than that shown in FIGS. 2 and 6. As one example, each node may include multiple network interfaces (e.g., an Ethernet interface, a Fast Ethernet interface, etc.). As another example, the memories may be separated into main memory (e.g., semiconductor memory) and secondary memory (e.g., disks, tape, etc.). As yet another example, one or more of the controllers 34, 126 may include specialized hardware (e.g., ASICs, analog circuitry, etc.), a single data processor, multiple processing devices, etc. Furthermore, one or more of the components or portions of a component can reside remotely (e.g., the database 42 of FIG. 2 could be distributed across multiple network nodes).

Additionally, the invention is not limited to TCP/IP networks. Rather, the invention can be applied to other network types which include utilities for detecting and removing stale data elements, or which provide tools for tracing routes therethrough. Accordingly, the data elements 24 can be packets, frames, cells, messages, etc. and utilized within connectioned or connectionless situations.

Furthermore, the information in the return signal (the signal indicating that a node has removed a special stale data element 24 from the network 20) can include data other than resource usage information. For example, the signal can include resource usage information for one or more unrelated data elements 24 (e.g., a data element 24 that is different that the special stale data element 24 which triggered the signal). As another example, the signal can include general performance information (e.g., traffic data for the node 120 sending the signal).

Additionally, it should be understood that the tuning process of step 112 of FIG. 5 can be implemented in an automated manner (e.g., directed by one or more algorithms, scripts or command procedures) or implemented manually (e.g., by a systems administrator). Moreover, the tuning event can include one or more modifications of a node's tuning attributes, changes in policy (e.g., classification, scheduling, data element dropping decisions, etc.), or higher level changes in network behavior.

Furthermore, the source computer can be a data communications device (e.g., a router, switch, hub, etc.) itself. Alternatively, it can operate as a host computer capable of exchanging data elements 24 with the network 20 as well as being capable of providing other functions (e.g., disk server, computer server, etc.).

What is claimed is:

1. In a computer, a method for obtaining resource usage information from a node of a network, the method comprising the steps of:

generating a data element having (i) a type value for a type parameter within the data element that will cause the node of the network to determine that the data element is be internally processed as a non-stale data element rather than a stale data element, and (ii) a time value for a time parameter within the data element that will cause the node of the network to determine that the data element is stale to prevent subsequent transmission of the data element from the node of the network when the node of the network processes the data element;

sending the data element to the node of the network; and receiving a signal from the node of the network, the signal including (i) an indication that the node of the network has internally processed the data element as a non-stale data element rather than a stale data element and has removed the data element from the network, and (ii) resource usage information describing usage of resources by the node of the network when the node of the network internally processed the data element as a non-stale data element.

2. The method of claim 1 wherein the node of the network (i) includes multiple resources and (ii) is capable of processing non-stale data elements using different combinations of the multiple resources, and wherein the step of receiving includes the step of:

acquiring, as the resource usage information, a history which identifies a combination of the multiple resources that processed the data element as a non-stale data element.

3. The method of claim 1 wherein the time parameter within the data element is a Time-To-Live field, the contents of which identify a limit to the number of remaining nodes which can process the data element within the network, wherein the signal is an Internet Control Message Protocol error message, and wherein the step of receiving includes the step of:

acquiring, as the indication that the node of the network has removed the data element from the network, a notification that the limit to the number of remaining nodes which can process the data element within the network has been reached.

4. The method of claim 1 wherein the computer includes a database, and wherein the method further comprises the step of:

extracting the resource usage information from the signal;

updating contents of the database with the extracted resource usage information; and tuning the node of the network based on the updated contents of the database.

5. An apparatus for obtaining resource usage information from a node of a network, comprising:

a network interface for connecting to the network; and a controller coupled to the network interface, the controller being configured to:

generate a data element having (i) a type value for a type parameter within the data element that will cause the node of the network to determine that the data element is be internally processed as a non-stale data element rather than a stale data element, and (ii) a time value for a time parameter within the data element that will cause the node of the network to determine that the data element is stale to prevent subsequent transmission of the data element from the node of the network when the node of the network processes the data element, send the data element to the node of the network through the network interface, and receive a signal from the node of the network, the signal including (i) an indication that the node of the network has internally processed the data element as a non-stale data element rather than a stale data element and has removed the data element from the network, and (ii) resource usage information describing usage of resources by the node of the network when the node of the network internally processed the data element as a non-stale data element.

6. The apparatus of claim 5 wherein the node of the network (i) includes multiple resources and (ii) is capable of processing non-stale data elements using different combinations of the multiple resources, and wherein the controller includes:

circuitry that acquires, as the resource usage information, a history which identifies a combination of the multiple resources that processed the data element as a non-stale data element.

7. The apparatus of claim 5 wherein the time parameter within the data element is a Time-To-Live field, the contents of which identify a limit to the number of remaining nodes which can process the data element within the network, wherein the signal is an Internet Control Message Protocol error message, and wherein the controller includes:

circuitry that acquires, as the indication that the node of the network has removed the data element from the network, a notification that the limit to the number of remaining nodes which can process the data element within the network has been reached.

8. The apparatus of claim 5 further comprising:

a memory, coupled to the controller, which stores a database, wherein the controller is configured to:

extract the resource usage information from the signal;

update contents of the database with the extracted resource usage information; and tune the node of the network through the network interface based on the updated contents of the database.

9. A computer program product that includes a computer readable medium having instructions stored thereon for obtaining resource usage information from a node of a network, such that the instructions, when carried out by the computer, cause the computer to perform the steps of:

generating a data element having (i) a type value for a type parameter within the data element that will cause the node of the network to determine that the data element is be internally processed as a non-stale data element rather than a stale data element, and (ii) a time value for a time parameter within the data element that will cause the node of the network to determine that the data element is stale to prevent subsequent transmission of the data element from the node of the network when the node of the network processes the data element;

sending the data element to the node of the network; and receiving a signal from the node of the network, the signal including (i) an indication that the node of the network has internally processed the data element as a non-stale data element rather than a stale data element and has removed the data element from the network, and (ii) resource usage information describing usage of resources by the node of the network when the node of the network internally processed the data element as a non-stale data element.

10. The computer program product of claim 9 wherein the node of the network (i) includes multiple resources and (ii) is capable of processing non-stale data elements using different combinations of the multiple resources, and wherein the step of receiving includes the step of:

acquiring, as the resource usage information, a history which identifies a combination of the multiple resources that processed the data element as a non-stale data element.

11. In a node of a network, a method for providing resource usage information, the method comprising the steps of:

receiving a data element from a source computer of the network, the data element having (i) a type value for a type parameter that causes the node of the network to determine that the data element is be internally processed as a non-stale data element rather than a stale data element, and (ii) a time value for a time parameter that causes the node of the network to determine that the data element is stale to prevent subsequent transmission of the data element from the node of the network when the node of the network processes the data element;

determining that the data element is stale in response to the time value for the time parameter of the data element;

internally processing the data element as a non-stale data element in response to the type value for the type parameter of the data element; and removing the date element from the network and sending a signal to the source computer of the network, the signal including (i) an indication that the node of the network has removed the data element from the network, and (ii) resource usage information describing usage of resources by the node of the network when the node of the network internally processed the data element as a non-stale data element.

12. The method of claim 11 wherein the node of the network (i) includes multiple resources and (ii) is capable of processing non-stale data elements using different combinations of the multiple resources, and further comprising the steps of:

generating, as the resource usage information, a history which identifies the combination of multiple resources that processed the data element as a non-stale data element.

13. The method of claim 11 wherein the time parameter within the data element is a Time-To-Live field, the contents of which identify a limit to the number of remaining nodes which can process the data element within the network, wherein the step of determining includes the step of:

updating a value defined by the contents of the Time-To-Live field of the data element to determine that the limit to the number of remaining nodes which can process the data element within the network has been reached, and wherein the step of removing and sending includes the step of:

providing, as the signal to the source computer of the network, an Internet Control Message Protocol error message.

14. The method of claim 11 wherein the node of the network is capable of processing data elements based on a tuning attribute, and wherein the method further comprises the steps of:

receiving, from the source computer, a tuning command based on the resource usage information; and adjusting the tuning attribute based on the tuning command in order to change a manner in which the node processes data elements.

15. A network node for providing resource usage information, comprising:

a network interface for connecting to a network;

a controller coupled to the network interface, the controller being configured to:

receive a data element from a source computer of the network through the network interface, the data element having (i) a type value for a type parameter that causes the node of the network to determine that the data element is be internally processed as a non-stale data element rather than a stale data element, and (ii) a time value for a time parameter that causes the node of the network to determine that the data element is stale to prevent subsequent transmission of the data element from the node of the network when the node of the network processes the data element;

determine that the data element is stale in response to the time value for the time parameter of the data element;

internally process the data element as a non-stale data element in response to the type value for the type parameter of the data element; and remove the data element from the network and send a signal to the source computer of the network through the network interface, the signal including (i) an indication that the node of the network has removed the data element from the network, and (ii) resource usage information describing usage of resources by the node of the network when the node of the network internally processed the data element as a non-stale data element.

16. The network node of claim 15 wherein the controller includes:

multiple resources; and a control module, coupled to the multiple resources, which is capable of processing non-stale data elements using different combinations of the multiple resources, the control module being configured to:

generate, as the resource usage information, a history which identifies the combination of multiple resources that processed the data element as a non-stale data element.

17. The network node of claim 15 wherein the time parameter within the data element Is a Time-To-Live field, the contents of which identify a limit to the number of remaining nodes which can process the data element within the network, and wherein the controller includes:

circuitry that (i) updates a value defined by the contents of the Time-To-Live field of the data element to determine that the limit to the number of remaining nodes which can process the data element within the network has been reached, and (ii) provides, as the signal to the source computer of the network, an Internet Control Message Protocol error message.

18. The network node of claim 15 wherein the controller is capable of processing data elements based on a tuning attribute, and wherein the controller includes:

circuitry that (i) receives, from the source computer through the network interface, a tuning command based on the resource usage information, and (ii) adjusts the tuning attribute based on the tuning command in order to change a manner in which the controller processes data elements.

19. A computer program product that includes a computer readable medium having instructions stored thereon for providing resource usage information, such that the instructions, when carried out by a computerized device, cause the computerized device to perform the steps of:

receiving a data element from a source computer of the network, the data element having (i) a type value for a type parameter that causes the computerized device to determine that the data element is be internally processed as a non-stale data element rather than a stale data element, and (ii) a time value for a time parameter that causes the computerized device to determine that the data element is stale to prevent subsequent transmission of the data element from the computerized device when the computerized device processes the data element;

determining that the data element is stale in response to the time value of the time parameter of the data element;

internally processing the data element as a non-stale data element in response to the type value for the type parameter of the data element; and removing the data element from the network and sending a signal to the source computer of the network, the signal including (i) an indication that the computerized device has removed the data element from the network, and (ii) resource usage information describing usage of resources within the computerized device when the computerized device internally processed the data element as a non-stale data element.

20. The computer program product of claim 19 wherein the computerized device (i) includes multiple resources and (ii) is capable of processing non-stale data elements using different combinations of the multiple resources, and wherein the instruction further cause the computerized device to perform the steps of:

generating, as the resource usage information, a history which identifies the combination of the multiple resources that processed the data element as a non-stale data element.

21. A system for obtaining resource usage information, comprising:

a source computer which provides a data element; and a network node, coupled to the source computer, which forms at least a portion of a network with the source computer, the network node being configured to:

receive the data element from the source computer, the data element having (i) a type value for a type parameter that causes the node of the network to determine that the data element is be internally processed as a non-stale data element rather than a stale data element, and (ii) a time value for a time parameter that causes the node of the network to determine that the data element is stale to prevent subsequent transmission of the data element from the node of the network when the node of the network processes the data element;

determine that the data element is stale in response to the time value for the time parameter of the data element;

internally process the data element as a non-stale data element in response to the type value for the type parameter of the data element; and remove the data element from the network and send a signal to the source computer, the signal including (i) an indication that the network node has removed the data element from the network, and (ii) resource usage information describing usage of resources by the network node when the node of the network internally processed the data element as a non-stale data element.

22. The system of claim 21 wherein the network node includes:

multiple resources; and a control module, coupled to the multiple resources, which is capable of processing non-stale data elements using different combinations of the multiple resources, the control module being configured to:

process the data element provided by the source computer as a non-stale data element using a combination of the multiple resources, and generate, as the resource usage information, a history which identifies the combination of the multiple resources that processed the data element as a non-stale data element.

23. The system of claim 21 wherein the time parameter within the data element is a Time-To-Live field, the contents of which identify a limit to the number of remaining nodes which can process the data element within the network, and wherein the network node includes:

circuitry that (i) updates a value defined by the contents of the Time-To-Live field of the data element to determine that the limit to the number of remaining nodes which can process the data element within the network has been reached, and (ii) provides, as the signal to the source computer of the network, an Internet Control Message Protocol error message.

24. The system of claim 21 wherein the source computer includes:

a memory which stores a database; and a controller, coupled to the memory, which is configured to:

extract the resource usage information from the signal, update contents of the database with the extracted resource usage information, and generate a tuning command based on the updated contents of the database, and send the tuning command to the network node; and wherein the network node is capable of processing data elements based on a tuning attribute, and wherein the network node includes:

circuitry that (i) receives, from the source computer, the tuning command, and (ii) adjusts the tuning attribute based on the tuning command in order to change a manner in which the network node processes data elements.

25. The method of claim 1 wherein the node is an intermediate device disposed between the computer and a target device, and wherein the step of sending the data element to the node includes the step of:

formatting the data element as a packet having (i) a destination address that identifies the target device and (ii) a Time-To-Live value which causes the node to consider the data element to be a stale packet upon receipt of the data element by the node.

26. The apparatus of claim 5 wherein the node is an intermediate device disposed between the apparatus and a target device; and wherein the controller, when sending the data element to the node, is configured to:

format the data element as a packet having (i) a destination address that identifies the target device and (ii) a Time-To-Live value which causes the node to consider the data element to be a stale packet upon receipt of the data element by the node.

27. The computer program product of claim 9 wherein the node is an intermediate device disposed between the apparatus and a target device; and wherein the instructions, when causing the computer to send the data element to the node, cause the computer to:

format the data element as a packet having (i) a destination address that identifies the target device and (ii) a Time-To-Live value which causes the node to consider the data element to be a stale packet upon receipt of the data element by the node.

28. The method of claim 11 wherein the node is an intermediate device disposed between the source computer and a target device;

and wherein the step of receiving includes the step of:

obtaining, as the data element, a packet having (i) a destination address that identifies the target device and (ii) a Time-To-Live value which causes the node to consider the data element to be a stale packet.

29. The network node of claim 15 wherein the node is an intermediate device disposed between the source computer and a target device;

and wherein controller, when receiving the data element, is configured to:

obtaining, as the data element, a packet having (i) a destination address that identifies the target device and (ii) a Time-To-Live value which causes the network node to consider the data element to be a stale packet.

30. The computer program product of claim 19 wherein the computerized device is an intermediate device disposed between the source computer and a target device; and wherein the instructions, when causing the computerized device to receive the data element, cause the computerized device to:

obtain, as the data element, a packet having (i) a destination address that identifies the target device and (ii) a Time-To-Live value which causes the computerized device to consider the data element to be a stale packet.

31. The system of claim 21 wherein the network node is an intermediate device disposed between the source computer and a target device;

and wherein network node, when receiving the data element, is configured to:

obtain, as the data element, a packet having (i) a destination address that identifies the target device and (ii) a Time-To-Live value which causes the network node to consider the data element to be a stale packet.

32. The method of claim 1 wherein the step of sending the data element to the node includes the step of:

providing, within the data element, a destination address which targets a device that is different than the node to route the data element in a direction leading to the device through the node.

33. The method of claim 32 wherein the step of receiving the signal includes the step of:

obtaining, as the signal, a packetized communication having a history which identifies processing of the data element as a non-stale data element by the node even though the data element is stale by the time the node receives the data element.

34. The apparatus of claim 5 wherein the controller, when sending the data element to the node, is configured to:

provide, within the data element, a destination address which targets a device that is different than the node to route the data element in a direction leading to the device through the node.

35. The apparatus of claim 34 wherein controller, when receiving the signal, is configured to:

obtain, as the signal, a packetized communication having a history which identifies processing of the data element as a non-stale data element by the node even though the data element Is stale by the time the node receives the data element.

36. The method of claim 11 wherein the step of receiving the data element includes the step of:

obtaining, within the data element, a destination address which targets a device that is different than the node to route the data element in a direction leading to the device through the node.

37. The method of claim 32 wherein the step of removing the data element form the network and sending the signal includes the step of:

providing, as the signal, a packetized communication having a history which identifies processing of the data element as a non-stale data element by the node even though the data element is stale by the time the node receives the data element.

38. The network node of claim 15 wherein the controller, when receiving the data element, is configured to:

obtain, within the data element, a destination address which targets a device that is different than the node to route the data element in a direction leading to the device through the node.

39. The network node of claim 38 wherein the controller, when removing the data element form the network and sending the signal, is configured to:

provide, as the signal, a packetized communication having a history which identifies processing of the data element as a non-stale data element by the node even though the data element is stale by the time the node receives the data element.

40. The system of claim 21 wherein the network node, when receiving the data element, is configured to:

obtain, within the data element, a destination address which targets a device that is different than the node to route the data element in a direction leading to the device through the node.

41. An apparatus for obtaining resource usage information from a node of a network, comprising:

a network interface for connecting to the network; and a controller coupled to the network interface, the controller having:

generating means for generating a data element having (i) a type value for a type parameter within the data element that will cause the node of the network to determine that the data element is be internally processed as a non-stale data element rather than a stale data element, and (ii) a time value for a time parameter within the data element that will cause the node of the network to determine that the data element is stale to prevent subsequent transmission of the data element from the node of the network when the node of the network processes the data element, sending means for sending the data element to the node of the network through the network interface, and receiving means for receiving a signal from the node of the network, the signal including (i) an indication that the node of the network has internally processed the data element as a non-stale data element rather than a stale data element and has removed the data element from the network, and (ii) resource usage information describing usage of resources by the node of the network when the node of the network internally processed the data element as a non-stale data element.

42. A network node for providing resource usage information, comprising:

a network interface for connecting to a network;

a controller coupled to the network interface, the controller having:

receiving means for receiving a data element from a source computer of the network through the network interface, the data element having (i) a type value for a type parameter that causes the node of the network to determine that the data element is be internally processed as a non-stale data element rather than a stale data element, and (ii) a time value for a time parameter that causes the node of the network to determine that the data element is stale to prevent subsequent transmission of the data element from the node of the network when the node of the network processes the data element;

determining means for determining that the data element is stale in response to the time value for the time parameter of the data element; and processing means for internally processing the data element as a non-stale data element in response to the type value for the type parameter of the data element, removing the data element from the network and sending a signal to the source computer of the network through the network interface, the signal including (i) an indication that the node of the network has removed the data element from the network, and (ii) resource usage information describing usage of resources by the node of the network when the node of the network internally processed the data element as a non-stale data element.

43. The method of claim 33 wherein the step of obtaining includes the step of:

acquiring a bit pattern within the packetized communication, the bit pattern including a series of bits, each bit in the series corresponding to a respective resource of the node of the network; wherein, when that bit is set, the bit pattern indicates usage of the respective resource by the node of the network when processing the data element and, when that bit is clear, the bit pattern indicates no usage of the respective resource by the node of the network when processing the data element.

* * * * *